(12) United States Patent
Sakai

(10) Patent No.: US 10,220,448 B2
(45) Date of Patent: Mar. 5, 2019

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Kouhei Sakai, Moriyama (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 14/381,244

(22) PCT Filed: Jan. 30, 2013

(86) PCT No.: PCT/JP2013/052089
§ 371 (c)(1),
(2) Date: Aug. 27, 2014

(87) PCT Pub. No.: WO2013/129016
PCT Pub. Date: Sep. 6, 2013

(65) Prior Publication Data
US 2015/0090080 A1  Apr. 2, 2015

(30) Foreign Application Priority Data
Feb. 29, 2012 (JP) .................................. 2012-042887

(51) Int. Cl.
*B23B 27/14* (2006.01)
*B23B 27/16* (2006.01)

(52) U.S. Cl.
CPC ............ *B23B 27/143* (2013.01); *B23B 27/16* (2013.01); *B23B 27/1607* (2013.01);
(Continued)

(58) Field of Classification Search
CPC .......... B23B 2200/32; B23B 2200/321; B23B 2200/323; B23B 27/1618; B23B 27/1637;
(Continued)

(56) References Cited

U.S. PATENT DOCUMENTS 5,230,591 A * 7/1993 Katbi .................... B23B 27/143
407/114
5,265,985 A * 11/1993 Boppana ............... B23B 27/143
407/114

(Continued)

FOREIGN PATENT DOCUMENTS

EP  1852200 A2 * 11/2007 ........... B23B 27/143
EP  2322301 A1 *  5/2011 ........... B23B 27/143
(Continued)

OTHER PUBLICATIONS

International Search Report, PCT/JP2013/052089, dated Mar. 14, 2013, 1 pg.

*Primary Examiner* — Ryan C Rufo
(74) *Attorney, Agent, or Firm* — Volpe and Koenig, P.C.

(57) ABSTRACT

A cutting insert that has, in an upper surface, a convex portion including a main portion having a flat upper end surface, a first portion projecting from the main portion to a corner portion of the upper surface, a second portion projecting from the first portion to the corner portion, and a third portion projecting from the second portion to the corner portion. Upper end heights of the second portion and the third portion are fixed toward the corner portion, respectively. The first portion and the second portion are connected by a first flat inclined wall surface, the second portion and the third portion are connected by a second wall surface of a convex curved surface, and a front end of the third portion and the breaker groove are connected by a third wall surface of a convex curved surface.

14 Claims, 6 Drawing Sheets

(52) U.S. Cl.
CPC ... *B23B 2200/081* (2013.01); *B23B 2200/321* (2013.01); *Y10T 82/10* (2015.01); *Y10T 407/2268* (2015.01); *Y10T 407/24* (2015.01)

(58) Field of Classification Search
CPC .............. B23B 27/1648; B23B 27/143; B23B 27/1607; B23B 27/14; B23B 27/16; B23B 27/22; B23B 2200/081; Y10T 407/24; Y10T 407/245; Y10T 407/235
See application file for complete search history.

(56) References Cited

U.S. PATENT DOCUMENTS

| | | | | |
|---|---|---|---|---|
| 5,449,255 | A * | 9/1995 | Katbi | B23B 27/143 |
| | | | | 407/114 |
| 6,599,061 | B1 * | 7/2003 | Nelson | B23B 27/143 |
| | | | | 407/114 |
| 6,848,868 | B2 * | 2/2005 | Kasperik | B23B 27/143 |
| | | | | 407/114 |
| 8,137,035 | B2 * | 3/2012 | Uchijo | B23B 27/007 |
| | | | | 407/115 |
| 8,251,618 | B2 * | 8/2012 | Kobayashi | B23B 27/143 |
| | | | | 407/114 |
| 8,267,623 | B2 * | 9/2012 | Park | B23B 27/143 |
| | | | | 407/113 |
| 8,491,231 | B2 * | 7/2013 | Edler | B23B 27/145 |
| | | | | 407/103 |
| 8,939,684 | B2 * | 1/2015 | Chistyakov | B23B 27/045 |
| | | | | 407/115 |
| 2009/0226269 | A1 * | 9/2009 | Iyori | B23B 27/143 |
| | | | | 407/114 |
| 2011/0033252 | A1 * | 2/2011 | Nishida | B23B 27/143 |
| | | | | 407/114 |
| 2011/0070040 | A1 * | 3/2011 | Park | B23B 27/143 |
| | | | | 407/113 |
| 2011/0142555 | A1 | 6/2011 | Yamazaki et al. | |
| 2012/0170987 | A1 * | 7/2012 | Komatsuka | B23B 27/141 |
| | | | | 407/114 |
| 2012/0198973 | A1 * | 8/2012 | Schleinkofer | B23B 27/143 |
| | | | | 82/117 |
| 2013/0236257 | A1 * | 9/2013 | Nada | B23B 27/141 |
| | | | | 407/114 |
| 2013/0236258 | A1 * | 9/2013 | Nada | B23B 27/141 |
| | | | | 407/114 |
| 2014/0286718 | A1 * | 9/2014 | Scherman | B23B 27/143 |
| | | | | 407/114 |

FOREIGN PATENT DOCUMENTS

| | | | | |
|---|---|---|---|---|
| JP | 8-11008 A | | 1/1996 | |
| JP | 2010-69614 A | | 4/2010 | |
| JP | 2010069614 A | * | 4/2010 | ............ B23B 27/22 |
| JP | WO 2014192798 A1 | * | 12/2014 | ........... B23B 27/143 |
| WO | 20111/038433 A1 | | 4/2011 | |
| WO | WO 2011038433 A1 | * | 4/2011 | ........... B23B 27/143 |

* cited by examiner

CUTTING INSERT, CUTTING TOOL, AND METHOD OF MANUFACTURING MACHINED PRODUCT

TECHNICAL FIELD

The present invention relates to a cutting insert, a cutting tool, and a method of manufacturing a machined product.

BACKGROUND ART

Conventionally, a throw-away cutting tool with a cutting insert attached to a holder is used for a cutting tool for use in cutting process. Such a cutting insert used for this cutting tool is generally configured to include an upper surface, a lower surface and a side surface, and a cutting edge is formed at an intersecting portion between the upper surface and the side surface. By bringing the cutting edge into contact with a workpiece such as a metal member, it is possible to cut a workpiece.

A configuration of such a cutting tool is proposed in which projections (breaker projections) to be in contact with chips of workpieces are provided on an upper surface thereof in the same manner as the cutting insert disclosed in Patent Document 1. The cutting insert disclosed in Patent Document 1 curves a chip of a workpiece into a spring shape by bringing the chip into contact with a breaker projection, and cuts the chip by a bending stress applied to the chip upon curving.

Further, the cutting insert disclosed in Patent Document 1 has two breaker surfaces to support a difference in a chip width upon small depth cut and large depth cut. Consequently, it is possible to provide a cutting insert of a wide range of cutting process.

In recent years, a cutting insert which performs good chip processing under a wider range of cutting conditions is demanded. However, the cutting insert disclosed in Patent Document 1 has difficulty in performing a wide range of cutting process. This is because the cutting insert disclosed in Patent Document 1 has projections of oval spherical shapes, and chips are placed in point contact with the projections. When projections have oval spherical shapes, a chip is curved at an adequate position of a curved surface and angle according to a fine change in the feeding amount upon low feed process. However, when the feeding amount is great and a cutting amount is also great, a chip can easily get over the projection of the oval spherical shape. Therefore, even when two projections of spherical surface shapes are provided according to a feeding amount, and when the feeding amount is great and the cutting amount is great, there is a problem that a chip gets over a projection, is stretched long, and then damages a machined surface or entangles with a tool holder.

Patent Document 1: Japanese Patent Laid-Open Publication No. 8-11008

SUMMARY OF THE INVENTION

A cutting insert according to one aspect of the present invention has a polygonal plate shape, and an upper surface, a lower surface and a side surface located between the upper surface and the lower surface, and a cutting edge is formed at an intersecting portion between the upper surface and the side surface. The upper surface includes a breaker groove located along the cutting edge, and a convex portion located closer to an inner side than the breaker groove.

The convex portion includes a main portion which has a flat upper end surface, a first projecting portion which projects from the main portion to a corner portion of the upper surface, a second projecting portion which projects from the first projecting portion to the corner portion, and whose height from the lower surface is lower than an upper end of the first projecting portion, and a third projecting portion which projects from the second projecting portion to the corner portion, and whose height from the lower surface is lower than an upper end of the second projecting portion.

Further, heights of upper ends of the second projecting portion and the third projecting portion are fixed toward the corner portion, respectively. The first projecting portion and the second projecting portion are connected by a first wall surface which is a flat inclined surface, the second projecting portion and the third projecting portion are connected by a second wall surface of a convex curved surface shape, and a front end of the third projecting portion and the breaker groove are connected by a third wall surface of a convex curved surface shape.

PREFERRED EMBODIMENTS FOR CARRYING OUT THE INVENTION

<Cutting Insert>

Figure 1:
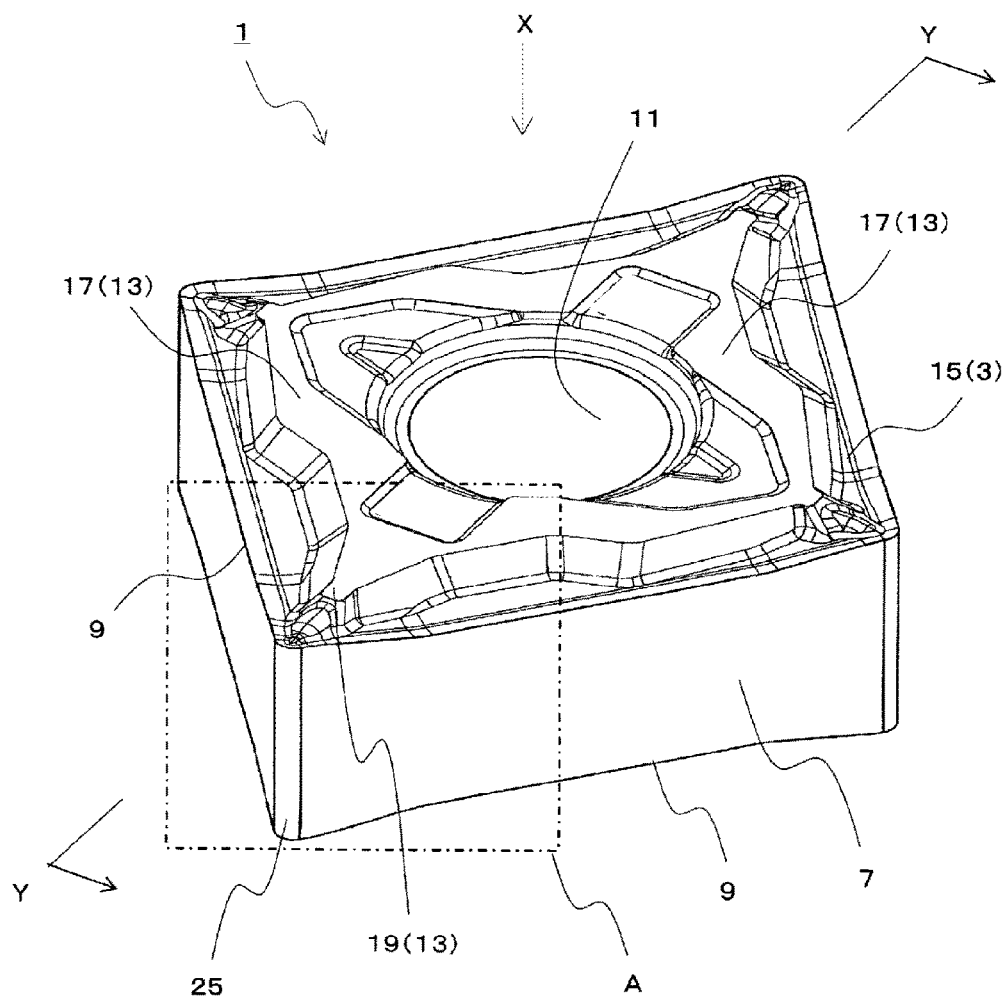
FIG. 1 shows a perspective view showing a cutting insert according to a first embodiment of the present invention.

A cutting insert according to one embodiment will be described below in detail with reference to the drawings.

Meanwhile, each drawing referred to below simplifies only main members required to explain the present invention among components according to the embodiment for ease of description. Hence, the cutting insert according to the present invention may have arbitrary components which are not shown in each drawing referred to in the present description. Further, the dimensions of the members in each drawing do not exactly reflect dimensions of actual components and dimension ratios and the like of each member.

As shown in FIGS. 1 to 5, a cutting insert 1 according to the present embodiment has an upper surface 3 and a lower surface 5 whose shapes are square shapes when seen from a plan view and, more specifically, diamond shapes. Further, four side surfaces 7 connected to the upper surface 3 and the lower surface 5 are provided between the upper surface 3 and the lower surface 5. The upper surface 3 and the lower surface 5 have substantially same shapes which overlap each other when seen from a plan view. Hence, the four side surfaces 7 located between the upper surface 3 and the lower surface 5 are formed vertically with respect to the upper surface 3 and the lower surface 5. These upper surface 3, lower surface 5 and side surfaces 7 form the cutting insert 1 into a polygonal plate shape, and, more specifically, into a square plate shape.

Further, cutting edges 9 are formed at an intersecting portion between the upper surface 3 and the side surface 7, and at an intersecting portion between the lower surface 5 and the side surface 7. That is, the cutting insert 1 according to the present embodiment is a so-called negative-type cutting insert 1 which has the cutting edges 9 formed at the intersecting portion between the upper surface 3 and the side surface 7 and, in addition, at the intersecting portion between the lower surface 5 and the side surface 7. In addition, the cutting insert 1 may be a so-called positive-type cutting insert 1 which has the cutting edge 9 formed only at the intersecting portion between the upper surface 3 and the side surface 7.

The cutting insert 1 according to the present embodiment is the negative-type, and the lower surface 5 of the cutting insert 1 according to the present embodiment employs the same configuration as that of the upper surface 3 which is not shown in particular. The negative-type cutting insert 1 can be vertically turned upside down and used. That is, when the lower surface 5 of the cutting insert 1 is attached as a seating surface to a holder 103, the cutting edge 9 formed at the intersecting portion between the upper surface 3 and the side surface 7 of the cutting insert 1 can be used for cutting process. Further, when the upper surface 3 of the cutting insert 1 is attached as a seating surface to the holder 103 by turning the cutting insert 1 upside down, the cutting edge 9 formed at the intersecting portion between the lower surface 5 and the side surface 7 of the cutting insert 1 can be used for cutting process.

A height of the cutting edge 9 from the lower surface 5 may be fixed. However, a portion of the cutting edge 9 according to the present embodiment located at a corner portion 25 and a portion of the cutting edge 9 located between the adjacent corner portions 25 have fixed heights from the lower surface 5 respectively for the purpose of reducing a cutting resistance upon high depth cut, and the cutting edge 9 is inclined toward the lower surface as being apart from the corner portion 25.

A longitudinal direction width of the upper surface 3 of the diamond shape in the cutting insert 1 according to the present embodiment is set to, for example, about 15 to 25 mm. Further, a lateral direction width is set to about 10 to 22 mm. Longitudinal direction and lateral direction widths of the lower surface 5 of the diamond shape are set according to the size of the above upper surface 3. The thickness of the cutting insert 1 is set to, for example, 3 to 7 mm. In this regard, the thickness means a vertical direction width from a portion at the uppermost position of the upper surface 3 to a portion at the lowermost position of the lower surface 5 when the cutting insert 1 is seen from the side view.

A material of the cutting insert 1 is, for example, cemented carbide or cermet. A composition of cemented carbide includes, for example, WC—Co produced by adding cobalt (Co) powders to tungsten carbide (WC) and sintering the resultant material, WC—TiC—Co produced by doping WC—Co with titanium carbide (TiC) and WC—TiC—TaC—Co produced by doping WC—TiC—Co with tantalum carbide (TaC). Further, cermet is a sintered composite material produced by mixing metal in ceramic components, and, more specifically, titanium compounds whose main component is titanium carbide (TiC) or titanium nitride (TiN).

The surface of the cutting insert 1 may be coated by a coating using a chemical vapor deposition (CVD) method or a physical vapor deposition (PVD) method. A composition of the coating includes, for example, titanium carbide (TiC), titanium nitride (TiN), titanium carbonitride (TiCN) and alumina ($Al_2O_3$).

The upper surface 3 of the cutting insert 1 according to the present embodiment includes breaker groove (groove portion) 15 located along the cutting edge 9, and convex portion 13 located closer to an inner side than the breaker groove 15. In the cutting insert 1 according to the present embodiment, the groove portion 15 form the periphery of the upper surface 3 and are located to surround the convex portion 13. The groove portion 15 has a function of guiding a chip of a workpiece 201 in a moving direction upon cutting process of the workpiece 201. Further, although not shown, the lower surface 5 likewise includes breaker groove (groove portion) located along the cutting edge, and convex portion located closer to an inner side than the breaker groove.

A rake angle of a region of the breaker groove 15 along the cutting edge 9 is maximum near the corner portion 25 for the purpose of raking a chip in a high depth cut region and facilitating curing of the chip and reducing a cutting resistance. Further, an angle is relatively small compared to the angle of the above portion to maintain strengths of a portion corresponding to the corner portion 25 and a portion apart from the corner portion 25.

The convex portion 13 has a main portion 17 which has a flat upper end surface, a first projecting portion 19 which projects from the main portion 17 to the corner portion 25 of the upper surface 3, a second projecting portion 21 which projects from the first projecting portion 19 to the corner portion 25, and a third projecting portion 23 which projects from the second projecting portion 21 to the corner portion 25. The height of the second projecting portion 21 from the lower surface 5 is lower than an upper end of the first projecting portion 19. Further, the height of the third projecting portion 23 from the lower surface 5 is lower than an upper end of the second projecting portion 21.

Furthermore, the height from the lower surface 5 includes a lower end of the lower surface 5, and means the height from a plane vertical to a through hole 11 described below. More specifically, in the cutting insert 1 according to the present embodiment, the height from the lower surface 5 means a vertical direction height from a lower end surface of the convex portion of the lower surface 5 corresponding to the upper end surface of the convex portion 13 of the upper surface 3.

Further, the through hole 11 which penetrates from the center of the upper surface 3 to the center of the lower surface 5 is formed in the cutting insert 1 according to the present embodiment. The through hole 11 is provided to allow insertion of a bolt 105 to screw and fix the cutting insert 1 to the holder 103 of a cutting tool 101. In addition, a clamp structure may be adopted for a method of fixing the cutting insert 1 to the holder 103 instead of the above screwing and fixing method.

The above first projecting portion 19, second projecting portion 21 and third projecting portion 23 function as so-called breakers for chips, respectively. More specifically, the third projecting portion 23 which is the closest to the corner portion 25 and whose height from the lower surface 5 is relatively low first functions as a breaker upon smalldepth cut such as low depth cut process. A relatively small chip cut by the cutting edge 9 upon smalldepth cut is curved when the chip flows along the groove portion 15 and contacts the third projecting portion 23.

Further, when a cutting amount of the workpiece 201 or a cutting tool 101 upon cutting process is a predetermined value or more, the width of the chip becomes wide and contacts the second projecting portion 21. Thus, when the chip contacts not only the third projecting portion 23 but also the second projecting portion 21, the second projecting portion 21 also functions as a breaker. In this case, the chip contacts the second projecting portion 21 and is thereby stably curved.

When the above cutting amount further becomes greater, the width of the chip becomes wider. Consequently, the chip contacts not only the third projecting portion 23 and the second projecting portion 21 but also the first projecting portion 19. Thus, when the chip also contacts the first projecting portion 19, the first projecting portion 19 also functions as a breaker. In this case, the chip contacts the first projecting portion 19 and is thereby curved. However, when the chip contacts the first projecting portion 19, the width of the chip becomes very wide. Therefore, a relatively great cutting resistance is likely to be applied to the first projecting portion 19 from a chip, and controlling of the chip also becomes difficult.

In the cutting insert 1 according to the present embodiment, heights of upper ends of the second projecting portion 21 and the third projecting portion 23 are fixed toward the corner portion 25, respectively. Further, the first projecting portion 19 and the second projecting portion 21 are connected by a first wall surface 19a which is a flat inclined surface, the second projecting portion 21 and the third projecting portion 23 are connected by a second wall surface 21a of a convex curved surface shape, and a front end of the third projecting portion 23 and the breaker groove 15 are connected by a third wall surface 23a of a convex curved surface shape.

When a chip width and a thickness are relatively small upon relatively low feed process such as low depth cut and low feed process, a chip contacts the second wall surface 21a or the third wall surface 23a. In this case, the second wall surface 21a and the third wall surface 23a have curved surface shapes which are configured convex upward and toward the corner portion 25. Consequently, it is possible to efficiently curve and cut the chip even upon the above low feed process.

More specifically, the second wall surface 21a and the third wall surface 23a have convex curved surface shapes as described above. Consequently, it is not necessary to bring a chip into contact with an inclined portion and, in other words, a friction due to a contact is not excessively increased. As a result, it is possible to reduce an excessive block of flow of a chip and, consequently, to efficiently curve the chip.

Further, even when a chip having a relatively great width and thickness gets over the second wall surface 21a and the third wall surface 23a of the convex curved surface shapes and moves upon relatively high feed process such as high depth cut and high feed process, the chip contacts not only the second wall surface 21a and the third wall surface 23a but also the first wall surface 19a. In this case, the chip has a relatively large thickness, so that the chip is hardly deformed. However, the first wall surface 19a is a flat inclined surface, so that a chip is more easily deformed by the first wall surface 19a compared to a case where the first wall surface 19a has a curved surface shape.

Further, the cutting insert 1 according to the present embodiment can stably bring chips into contact with the first wall surface 19a, the second wall surface 21a and the third wall surface 23a. Consequently, it is possible to bring chips into contact with a wide range of the first wall surface 19a, the second wall surface 21a and the third wall surface 23a and, consequently, to reduce application of an excessively great cutting resistance to a part of the cutting insert 1.

The upper end surface of the first projecting portion 19 of the cutting insert 1 according to the present embodiment has a flat surface shape. In this case, the height of the upper end surface of the first projecting portion 19 is the same as that of the upper end surface of the main portion 17.

As described above, the cutting insert 1 according to the present embodiment is a so-called negative-type cutting insert 1 which has the cutting edge 9 formed at the intersecting portion between the upper surface 3 and the side surface 7 and, in addition, at the intersecting portion between the lower surface 5 and the side surface 7. Further, the lower surface 5 of the cutting insert 1 according to the present embodiment employs the same configuration as that of the upper surface 3.

When, for example, the cutting edge 9 formed at the intersecting portion between the upper surface 3 and the side surface 7 is used, the lower end surface of the lower surface 5 corresponding to the flat upper end surface of the main portion 17 of the upper surface 3 is attached as a seating surface to the holder 103. In this regard, when the lower end surface of the first projecting portion in the lower surface 5 is located on the same plane as that of the lower end surface of the main portion, it is possible to increase the area of the seating surface and, consequently, more stably attach the cutting insert 1 to the holder 103.

Further, when the cutting edge 9 formed at the intersecting portion between the lower surface 5 and the side surface 7 is used, the flat upper end surface of the main portion 17 is attached as the seating surface to the holder 103 by turning the cutting insert 1 upside down. In this regard, when the height of the upper end of the first projecting portion 19 in the upper surface 3 is the same as the height of the upper end surface of the main portion 17, it is possible to more stably attach the cutting insert 1 to the holder 103 likewise.

The second projecting portion 21 extends from the first projecting portion 19 to the corner portion 25. When a chip contacts the first wall surface 19a and the chip is deformed, if the first wall surface 19a and the second wall surface 21a are close to each other, the chip is excessively deformed in some cases. Therefore, the chip is likely to be clogged without being curved in a spring shape or in a helical shape.

However, the second projecting portion 21 is located between the first wall surface 19a and the second wall surface 21a. Consequently, it is possible to provide an interval between the first wall surface 19a and the second wall surface 21a. Consequently, it is possible to reduce a likelihood that part of a chip is clogged near the second wall surface 21a, and deform the chip well by the first wall surface 19a, the second wall surface 21a and the third wall surface 23a.

Further, the second projecting portion 21 according to the present embodiment has an upward convex curved surface shape. When a chip moves from a direction inclined with respect to the direction in which the second projecting portion 21 projects, the chip also contacts the side surface of the second projecting portion 21. In this case, the second projecting portion 21 has an upward convex curved surface shape. Consequently, it is possible to easily deform chips which contact a side surface of the second projecting portion 21. Consequently, it is possible to further reduce a likelihood that chips are clogged.

Further, a chip which gets over the second wall surface 21a and moves toward the second projecting portion 21 is likely to contact the upper end surface of the second projecting portion 21. However, the second projecting portion 21 has the above shape and, consequently, it is possible to reduce an area in which the second projecting portion 21 and the chip contact with each other. Consequently, it is possible to further reduce a likelihood that chips are clogged.

The third projecting portion 23 extends from the second projecting portion 21 to the corner portion 25. When a chip contacts the second wall surface 21a and the chip is deformed, if the second wall surface 21a and the third wall surface 23a are close to each other, the chip is excessively deformed in some cases. Therefore, the chip is likely to be clogged without being curved in a spring shape or in a helical shape.

However, the third projecting portion 23 is located between the second wall surface 21a and the third wall surface 23a. Consequently, it is possible to provide an interval between the second wall surface 21a and the third wall surface 23a. Consequently, it is possible to reduce a likelihood that part of a chip is clogged near the third wall surface 23a, and to deform the chip well by the second wall surface 21a and the third wall surface 23a.

Further, the third projecting portion 23 according to the present embodiment has an upward convex curved surface shape. When a chip moves from a direction inclined with respect to the direction in which the third projecting portion 23 projects, the chip also contacts the side surface of the third projecting portion 23. In this case, the third projecting portion 23 has an upward convex curved surface. Consequently, it is possible to easily deform chips which contact a side surface of the third projecting portion 23. Consequently, it is possible to further reduce a likelihood that chips are clogged.

Further, a chip which gets over the third wall surface 23a and moves toward the second projecting portion 21 easily contacts the upper end surface of the third projecting portion 23. However, the third projecting portion 23 has the above shape and, consequently, it is possible to reduce an area in which the third projecting portion 23 and the chip contact. Consequently, it is possible to further reduce a likelihood that chips are clogged.

Figure 5:
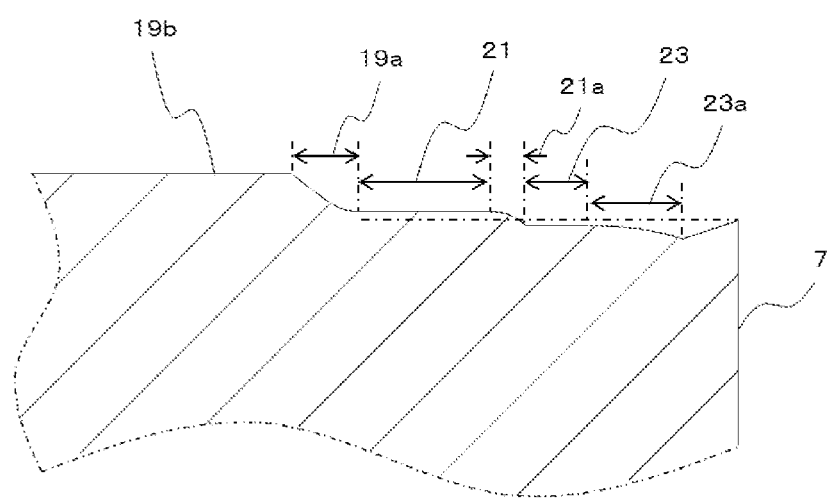
FIG. 5 shows an enlarged cross-sectional view enlarging a region including a first projecting portion, a second projecting portion and a third projecting portion in a cross section Y-Y of the cutting insert shown in FIG. 1.

Exemplary sizes of the first projecting portion 19, the second projecting portion 21 and the third projecting portion 23 are as follows. In FIG. 5, an extension direction width of the first wall surface 19a in a direction (horizontal direction in FIG. 5) in which the first, second and third projecting portions 23 project can be set to 0.2 to 0.4 mm. Further, a height direction width (vertical direction in FIG. 5) of the first wall surface 19a indicated by a difference between heights of the first projecting portion 19 and the second projecting portion 21 can be set to 0.08 to 0.16 mm.

Similarly, when a width in a direction in which the first, second and third projections portion 23 project is the extension direction width, the extension direction width of the second projecting portion 21 can be set to 0.5 to 1 mm. Further, the extension direction width of the second wall surface 21a can be set to 0.3 to 0.5 mm. Furthermore, a height direction width of the second wall surface 21a indicated by a difference between heights of the second projecting portion 21 and the third projecting portion 23 can be set to 0.05 to 0.1 mm.

The extension direction width of the third projecting portion 23 can be set to 0.05 to 0.15 mm. Further, the extension direction width of the third wall surface 23a can be set to 0.1 to 0.3 mm. Furthermore, a height direction width of the third wall surface 23a indicated by a difference between heights of the third projecting portion 23b and the bottom of the groove portion 15 can be set to 0.02 to 0.04 mm.

In this case, as illustrated in FIG. 5, in the cutting insert 1 according to the present embodiment, the upper end of the third projecting portion 23 is lower than the cutting edge 9, and the upper end of the second projecting portion 21 is higher than the cutting edge 9. The upper end of the third projecting portion 23 used upon process with a relatively small feeding amount is located lower than the cutting edge 9. Consequently, it is possible to reduce a likelihood that chips contact the third projecting portion 23 upon high feed process where chips move in a direction parallel to the lower surface 5. Consequently, it is possible to lower durability of the third projecting portion 23.

Further, even upon high feed process where chips move in the direction parallel to the lower surface 5, it is possible to stably bring chips into contact with the second projecting portion 21 used for process with a relatively large feeding amount compared to the third projecting portion 23.

Furthermore, as illustrated in FIG. 5, in the cutting insert 1 according to the present embodiment, the length of the third wall surface 23a is longer than the length of a third projecting portion 23 in a direction parallel to a direction in which the third projecting portion 23 projects, in other words, in a direction in which the third projecting portion 23 extends toward the corner portion 25. The cutting insert 1 employs this configuration and, consequently, can stably curve chips while being miniaturized for the following reasons.

The third projecting portion 23 is used for low feed process with a relatively small feeding amount compared to the second projecting portion 21. Hence, a chip thickness is thin and a chip is easily deformed, and therefore the chip is curved to a slight degree. Consequently, it is not necessary to provide a large interval between the second wall surface 21a and the third wall surface 23a. Meanwhile, a chip is easily deformed, and therefore it is necessary to increase a width of a third inclined surface in a direction in which the third projecting portion 23 projects to stably curve the chip in a spring shape or in a helical shape.

Further, as illustrated in FIG. 5, in the cutting insert 1 according to the present embodiment, the length of a second projecting portion 21 is longer than the length of the second wall surface 21a in a direction parallel to a direction in which the second projecting portion 21 projects, in other words, in a direction in which the second projecting portion 21 extends toward the corner portion 25.

As described above, the third projecting portion 23 is used for process with a relatively small feeding amount compared to the second projecting portion 21. Therefore, the length of the third wall surface 23a is made longer than the length of the third projecting portion 23. Meanwhile, the second projecting portion 21 is used for process with a relatively large feeding amount compared to the third projecting portion 23.

Hence, a chip thickness is large and a chip is hardly deformed, and therefore it is necessary to sufficiently secure an interval between the second wall surface 21a and the third wall surface 23a. Meanwhile, a chip is hardly deformed, so that, even when an angle formed between a chip moving direction and the second inclined surface is not small, the likelihood that chips are clogged is low. Hence, as described above, when the length of the second projecting portion 21 is longer than the length of the second wall surface 21a, it is possible to stably curve chips while miniaturizing the cutting insert 1.

Figure 2:
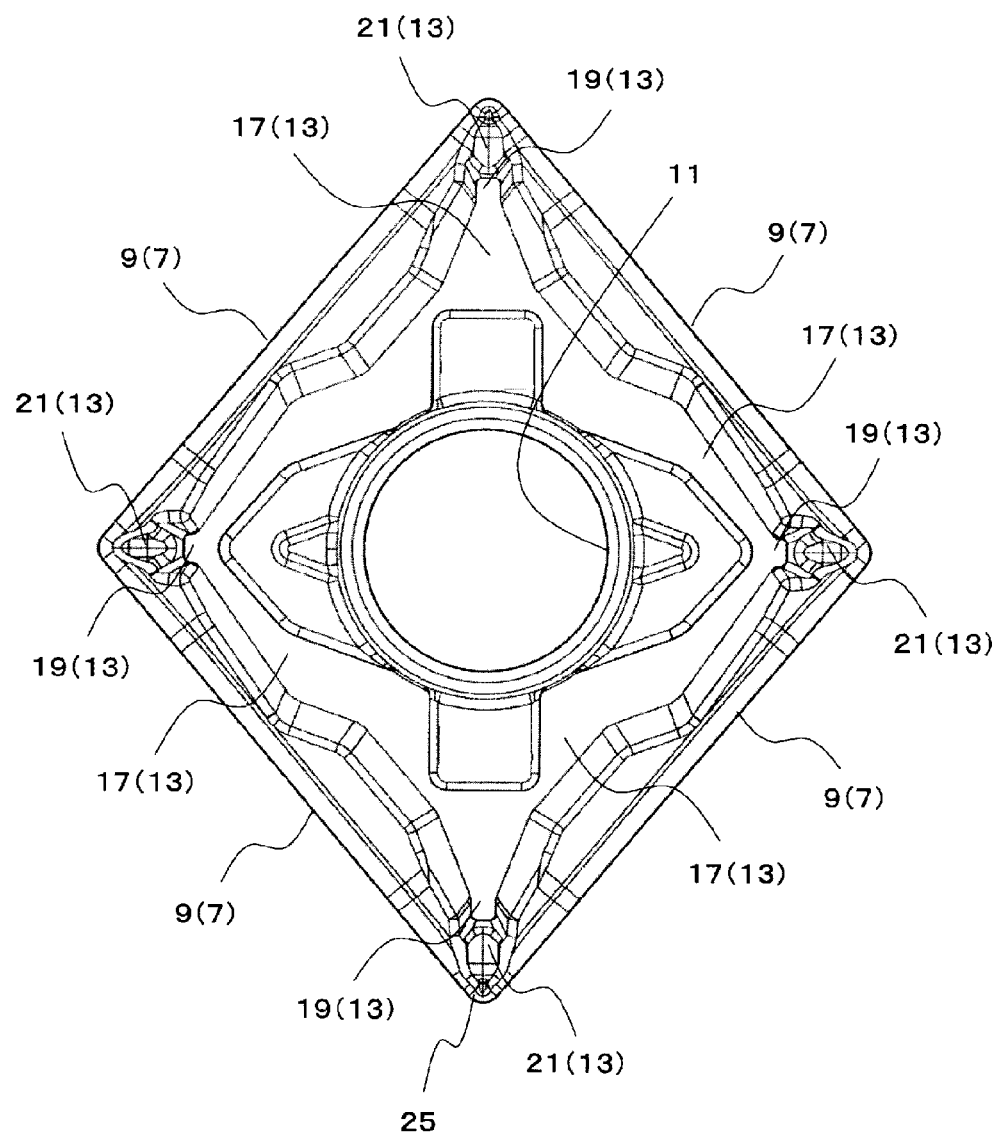
FIG. 2 shows a plan view of the cutting insert shown in FIG. 1 and seen from an X direction.
Figure 3:
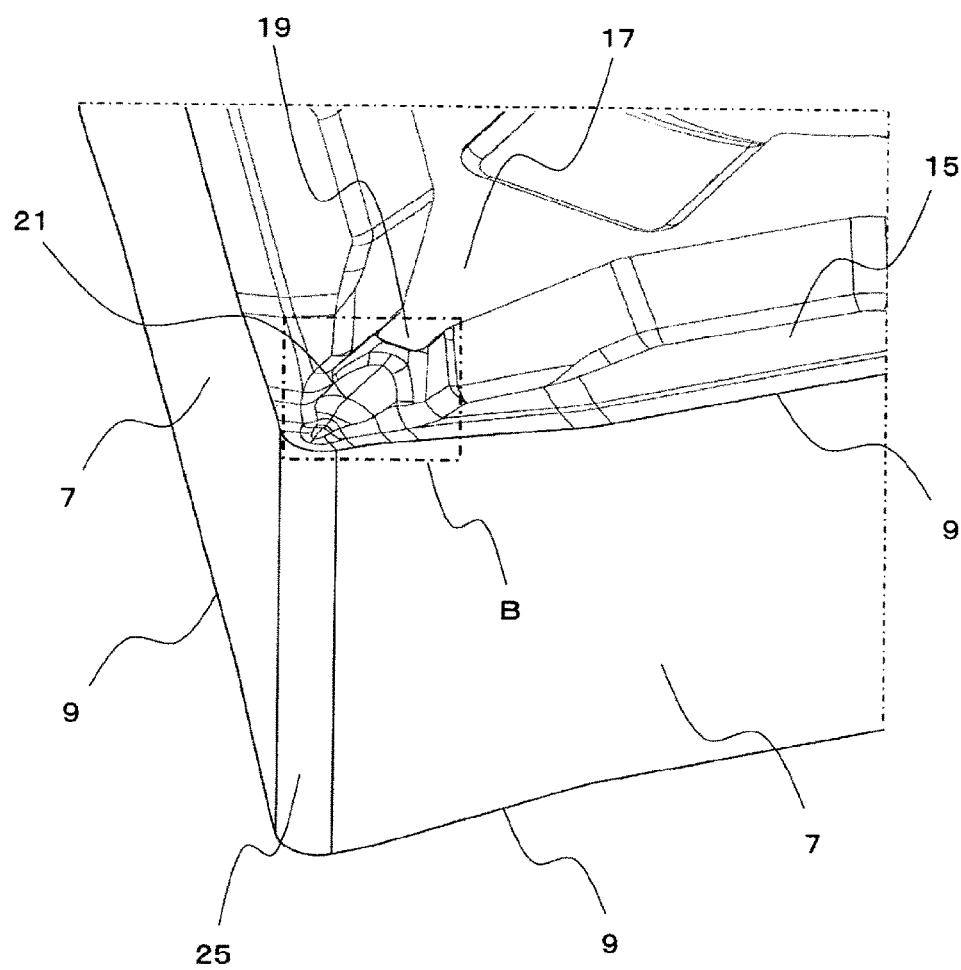
FIG. 3 shows an enlarged perspective view enlarging a region A of the cutting insert shown in FIG. 1.
Figure 4:
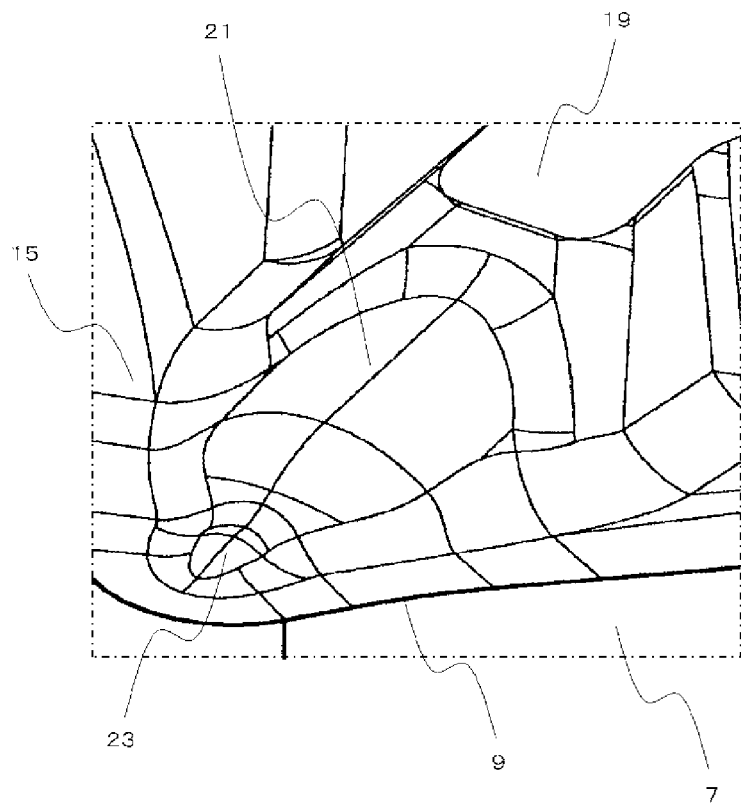
FIG. 4 shows an enlarged perspective view enlarging a region B of the cutting insert shown in FIG. 3.

In addition, as shown in FIG. 2, the cutting insert 1 according to the present embodiment has the upper surface 3 whose shape is a square shape of a diamond shape when seen from a plan view and is not limited to this mode. For example, the shape of the upper surface 3 may be a polygonal shape such as a triangular shape, a pentagonal shape, a hexagonal shape or an octagonal shape when seen from a plan view.

Further, that the shape is a square shape when seen from a plan view does not demand a strict square shape. The main portions at the outer periphery of the upper surface 3 may be formed with four sides and, for example, the corner portions 25 may have partially curved shapes.

<Cutting Tool>

Next, the cutting tool 101 according to one embodiment of the present invention will be described with reference to the drawings.

Figure 6:
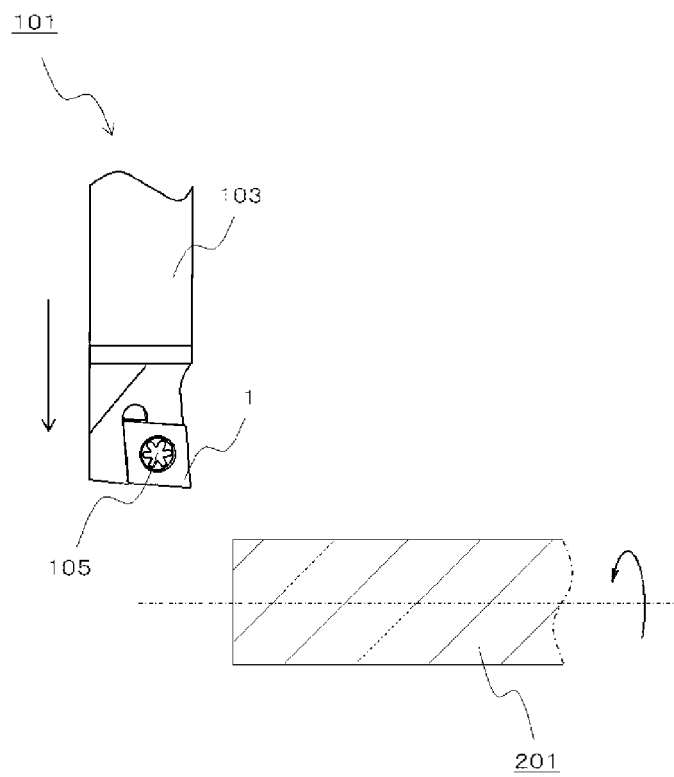
FIG. 6 shows a process view of the cutting method according to one embodiment of the present invention.
Figure 7:
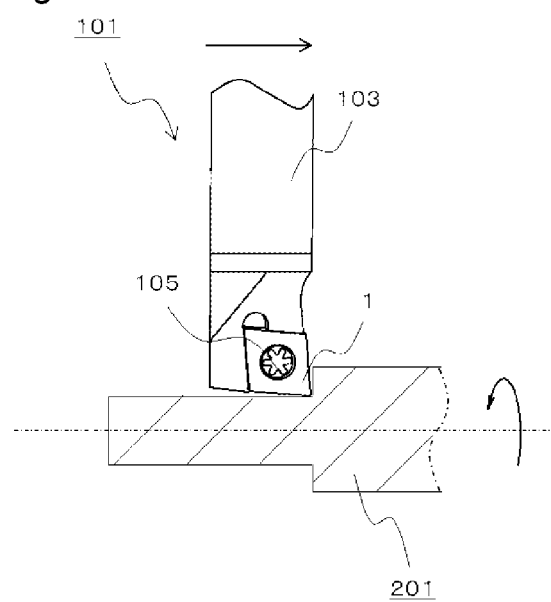
FIG. 7 shows a process view of the cutting method according to one embodiment of the present invention.
Figure 8:
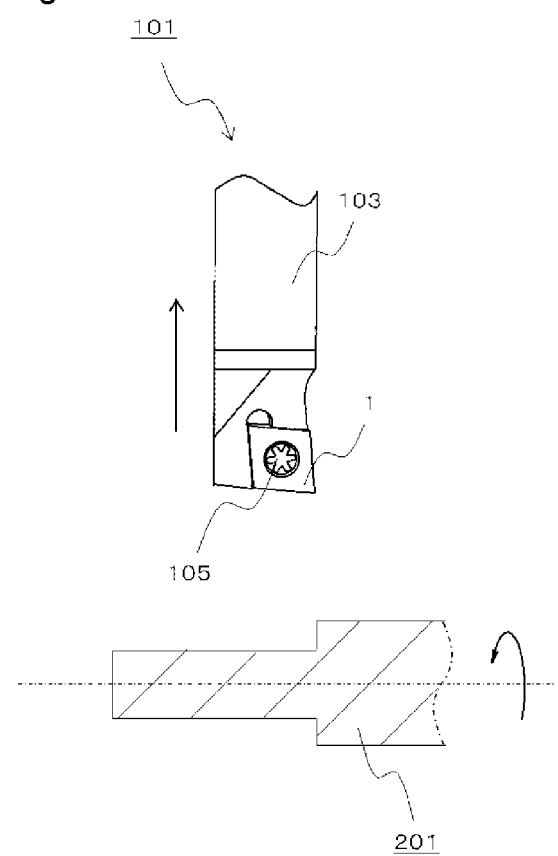
FIG. 8 shows a process view of the cutting method according to one embodiment of the present invention.

As shown in FIGS. 6 to 8, the cutting tool 101 according to the present embodiment includes the cutting insert 1 represented in the above embodiment, and the holder 103 to which the cutting insert 1 is attached. The holder 103 according to the present embodiment has a bar shape, and has at one end portion an insert pocket to which the cutting insert 1 is attached. The cutting insert 1 is attached such that the cutting edge 9 projects outward compared to the outer periphery of the holder 103.

In the present embodiment, the cutting insert 1 is fixed to the insert pocket by the bolt 105. That is, by inserting the bolt 105 in the through hole 11 of the cutting insert 1, inserting the front end of this bolt 105 in a screw hole (not shown) formed in the insert pocket, and screwing screw portions, the cutting insert 1 is attached to the holder 103.

Steel or cast iron can be used for the holder 103. Particularly, tough steel among these members is preferably used.

<Method of Manufacturing Machined Product>

Next, the method of manufacturing a machined product by cutting the workpiece 201 according to one embodiment of the present invention will be described with reference to the drawings.

The manufacturing method according to the present embodiment includes the following processes. That is, the manufacturing method includes, as shown in FIG. 6, process (1) of placing the cutting tool represented in the above embodiment relatively close to the workpiece 201 in a state where the workpiece 201 is rotated, as shown in FIG. 7, process (2) of bringing the cutting edge 9 of the cutting tool 101 into contact with the rotating workpiece 201, and, as shown in FIG. 8, process (3) of separating the cutting tool 101 from the workpiece 201.

According to the method of manufacturing the machined product according to the present embodiment, the cutting insert 1 has the first projecting portions 19, the second projecting portions 21 and the third projecting portion 23 employing the above characteristic configuration. Consequently, it is possible to support cutting process with a wide variety of feeding amounts.

In addition, in FIG. 6, the workpiece 201 is rotated in a state where the rotation axis is fixed, and the cutting tool 101 is placed close to the workpiece 201. Further, in FIG. 7, in a state where the workpiece 201 is rotated, cutting process is performed by bringing the cutting tool 101 into contact with the workpiece 201. Furthermore, in FIG. 8, the workpiece 201 is rotated in a state where the rotation axis is fixed, and is placed away from the cutting tool 101. In addition, according to the cutting method according to the present embodiment, the workpiece 201 is rotated in a state where the rotation axis is fixed and the cutting tool 101 is moved in each process. However, naturally, the cutting method is not limited to this mode.

For example, in the process (1), the workpiece 201 may be placed close to the cutting tool 101. Similarly, in the process (3), the workpiece 201 may be placed away from the cutting tool 101. To continue cutting process, process of holding a state where the workpiece 201 is rotated, and bringing the cutting edge 9 of the cutting insert 1 into contact with different portions of the workpiece 201 only needs to be repeated. When the cutting edge 9 in use is worn away, the cutting edge 9 which is not used only needs to be used by rotating the cutting insert 1 180 degrees with respect to the center axis of the through hole 11 or turning the cutting insert 1 upside down.

In addition, typical examples of materials of the workpiece 201 are carbon steel, steel alloy, stainless steel, cast iron or non-ferrous metal.

REFERENCE SIGNS LIST

1: Cutting Insert
3: Upper surface
5: Lower surface
7: Side surface
9: Cutting edge
11: Through hole
13: Primary surface portion
15: Groove portion
17: Main portion
19: First projecting portion
19a: First wall surface
21: Second projecting portion
21a: Second wall surface
23: Third projecting portion
23a: Third wall surface
25: Corner portion
101: Cutting tool
103: Holder
105: Bolt
201: Workpiece

The invention claimed is:

1. A cutting insert, comprising:
a polygonal plate shape formed by an upper surface, a lower surface, a mounting hole extending from the lower surface to the upper surface, and a side surface located between the upper surface and the lower surface, and
a cutting edge formed at an intersecting portion between the upper surface and the side surface, wherein
the upper surface comprises a breaker groove located along the cutting edge, and a convex portion located closer to a mounting hole longitudinal axis than the breaker groove,
the convex portion comprises a main portion which has a flat upper end surface, a first projecting portion which projects in a direction away from the main portion toward a corner portion of the upper surface, a second projecting portion which projects in a direction away from the first projecting portion toward the corner portion, and whose height from the lower surface is lower than an upper end of the first projecting portion, and a third projecting portion which projects in a direction away from the second projecting portion toward the corner portion, and whose height from the lower surface is lower than an upper end of the second projecting portion, the second projecting portion includes a height which is constant along a majority of a distance between the first projecting portion and the third projecting portion in a direction from the mounting hole longitudinal axis toward the corner portion,
a first flat inclined wall surface located between the first projecting portion and the second projecting portion,
a second wall surface located between the second projecting portion and the third projecting portion, wherein the second wall surface is a convex curved surface shape, and the entire second wall surface is apart from the first flat inclined wall surface, and
a third wall surface located between a front end of the third projecting portion and the breaker groove, wherein the third wall surface is a convex curved surface shape,
wherein the second projecting portion and the third projecting portion have upward convex curved surface shapes.

2. The cutting insert according to claim 1, wherein
the upper end of the third projecting portion is located lower than the cutting edge, and
the upper end of the second projecting portion is located higher than the cutting edge.

3. The cutting insert according to claim 1, wherein a length of the second projecting portion is longer than a length of the second wall surface in a direction parallel to a direction in which the second projecting portion projects.

4. The cutting insert according to claim 1, wherein a length of the third wall surface is longer than a length of the third projecting portion in a direction parallel to a direction in which the third projecting portion projects.

5. The cutting insert according to claim 1, wherein a height of the upper end of the first projecting portion is the same as a height of the upper end surface of the main portion.

6. A cutting tool, comprising:
the cutting insert according to claim 1; and
a holder with the cutting insert attached thereto.

7. A method of manufacturing a machined product, comprising:
rotating a workpiece;
bringing the cutting edge of the cutting insert of the cutting tool according to claim 6 into contact with the workpiece being rotated; and
separating the cutting tool from the workpiece.

8. The cutting insert according to claim 1, wherein the second projecting portion is wider than the third projecting portion in a direction perpendicular to the direction from the mounting hole longitudinal axis toward the corner portion.

9. The cutting insert according to claim 8, wherein the second projecting portion is wider than a front end of the second wall surface in the direction perpendicular to the direction from the mounting hole longitudinal axis toward the corner portion.

10. The cutting insert according to claim 9, wherein the third projecting portion is wider than the front end of the third wall surface in the direction perpendicular to the direction from the mounting hole longitudinal axis toward the corner portion.

11. The cutting insert according to claim 1, wherein the second wall surface and the third wall surface include convex curved surface shapes in the direction from the mounting hole longitudinal axis toward the corner portion and in a direction perpendicular to the direction from the mounting hole longitudinal axis toward the corner portion.

12. The cutting insert according to claim 1, wherein the third projecting portion is apart from the first flat inclined wall surface.

13. The cutting insert according to claim 1, wherein the first projecting portion has a flat surface shape.

14. A cutting insert, comprising:
a polygonal plate shape formed by an upper surface, a lower surface, a mounting hole extending from the lower surface to the upper surface, and a side surface located between the upper surface and the lower surface, and
a cutting edge formed at an intersecting portion between the upper surface and the side surface, wherein
the upper surface comprises a breaker groove located along the cutting edge, and a convex portion located closer to a mounting hole longitudinal axis than the breaker groove,
the convex portion comprises a main portion which has a flat upper end surface, a first projecting portion which projects in a direction away from the main portion toward a corner portion of the upper surface, a second projecting portion which projects in a direction away from the first projecting portion toward the corner portion, and whose height from the lower surface is lower than an upper end of the first projecting portion, and a third projecting portion which projects in a direction away from the second projecting portion toward the corner portion, and whose height from the lower surface is lower than an upper end of the second projecting portion,
the second projecting portion includes a height which is constant along a majority of a distance between the first projecting portion and the third projecting portion in a direction from the mounting hole longitudinal axis toward the corner portion,
a first flat inclined wall surface located between the first projecting portion and the second projecting portion,
a second wall surface located between the second projecting portion and the third projecting portion, wherein the second wall surface is a convex curved surface shape positioned apart from the first flat inclined wall surface, and
a third wall surface located between a front end of the third projecting portion and the breaker groove, wherein the third wall surface is a convex curved surface shape,
wherein the first projecting portion has a flat surface shape,
the second projecting portion and the third projecting portion have upward convex curved surface shapes,
the third wall surface is apart from the first flat inclined wall surface, and
wherein the third projecting portion is apart from the first flat inclined wall surface.

* * * * *